(12) United States Patent
Muthuswamy

(10) Patent No.: US 10,187,841 B1
(45) Date of Patent: Jan. 22, 2019

(54) METHOD AND SYSTEM FOR SWITCHING DATA-PATHS IN HETEROGENEOUS WIRELESS COMMUNICATION NETWORKS

(71) Applicant: WIPRO LIMITED, Bangalore, IN (US)

(72) Inventor: Sridharan Muthuswamy, San Jose, CA (US)

(73) Assignee: WIPRO LIMITED, Bangalore (IN)

( * ) Notice: Subject to any disclaimer, the term of this patent is extended or adjusted under 35 U.S.C. 154(b) by 0 days.

(21) Appl. No.: 15/719,838

(22) Filed: Sep. 29, 2017

(51) Int. Cl.
*H04W 40/16* (2009.01)
*H04W 16/14* (2009.01)

(52) U.S. Cl.
CPC ........... *H04W 40/16* (2013.01); *H04W 16/14* (2013.01)

(58) Field of Classification Search
CPC .............. H04L 1/00; H04B 17/24; H01Q 1/32
USPC ..... 455/501, 458, 562.1; 370/252, 311, 329, 370/332
See application file for complete search history.

(56) References Cited

U.S. PATENT DOCUMENTS

| 4,212,651 A | 7/1980 | Eissenberg et al. | |
|---|---|---|---|
| 2009/0196258 A1 | 8/2009 | Escobar Sanz et al. | |
| 2011/0124290 A1* | 5/2011 | Lou | H04B 7/0689 455/63.1 |
| 2012/0014274 A1* | 1/2012 | Muraoka | H04W 52/0206 370/252 |
| 2012/0040701 A1* | 2/2012 | Tong | H04W 52/243 455/501 |
| 2015/0271729 A1 | 9/2015 | Sirotkin et al. | |
| 2016/0165575 A1* | 6/2016 | Park | H04W 72/1268 370/329 |

(Continued)

FOREIGN PATENT DOCUMENTS

| WO | 2008116027 A2 | 9/2008 |
|---|---|---|
| WO | 2016199208 A1 | 12/2016 |

OTHER PUBLICATIONS

Mukhopadhyay, A., "Handover from LTE to VSAT with an Analysis to Provide Optimized Performance in Telemedicine Ambulances", Abstract, Article in International Journal of Applied Engineering Research 10, (2015), 5 pages.

(Continued)

*Primary Examiner* — Kiet M Doan
(74) *Attorney, Agent, or Firm* — Finnegan, Henderson, Farabow, Garrett & Dunner, LLP

(57) ABSTRACT

A system and method is provided for switching data-paths in heterogeneous wireless communication network. In one embodiment, the method includes receiving signal to noise ratio (SNR) samples for a downlink signal and for an uplink signal, and for each of antennas of a primary wireless communication network with respect to an access device. The method further includes dynamically processing the SNR samples to detect one of a cell edge event and a network re-entry event with respect to each of the downlink signal and the uplink signal. Upon detection of the cell edge event for the downlink signal or for the uplink signal, the method includes disabling a data-path between the primary wireless communication network and the access device. Further, upon detection of the network re-entry event for the downlink signal and for the uplink signal, the method includes enabling the data-path between the primary wireless communication network and the access device.

19 Claims, 7 Drawing Sheets

(56) References Cited

U.S. PATENT DOCUMENTS

2016/0174241 A1* 6/2016 Ansari .................. H04W 24/02
　　　　　　　　　　　　　　　　　　　　　　370/329

OTHER PUBLICATIONS

Anas, M., et al., "Performance Evaluation of Received Signal Strength Based Hard Handover for UTRAN LTE", IEEE, (2007), pp. 1046-1050.
Cho, S., et al., "Hard Handoff Scheme Exploiting Uplink and Downlink Signals in IEEE 802.16e Systems", IEEE (2006), pp. 1236-1240.
Garmonov, A., et al., "QoS-Oriented Intersystem Handover Between IEEE 802.11b and Overlay Networks", IEEE vol. 57, No. 2 (2008), pp. 1142-1154.
Extended European Search Report issued in the European Patent Office in counterpart European Application No. 17209580.4, dated Jul. 10, 2018, 12 pages.

* cited by examiner

METHOD AND SYSTEM FOR SWITCHING DATA-PATHS IN HETEROGENEOUS WIRELESS COMMUNICATION NETWORKS

TECHNICAL FIELD

This disclosure relates generally to wireless communication network, and more particularly to a system and method for switching data-paths in heterogeneous wireless communication network.

BACKGROUND

Advancements in the field of wireless communication network (e.g., LTE, VSAT, etc.) have increased the consumption of various data services such as voice over IP (VoIP), video streaming, and so forth. Such data services need seamless connectivity and good quality of service (QoS), particularly for situations such as medical emergency, disaster relief operations, navigation, etc. Typically, heterogeneous network may be employed to provide for seamless connectivity and QoS, and may include a primary communication network and a back-up communication network. However, maintaining QoS becomes a challenge while handling mobility of an access device, such as user equipment (UE), even when heterogeneous network is employed.

One of the challenges in the heterogeneous network when supporting mobility and seamless network connectivity is vertical handover (VHO). The VHO is a process of changing the ongoing network connection from one communication network to the other in order to ensure seamless connectivity and to maintain a good QoS, and occurs when the access device switches from one wireless network to another wireless network. A smooth VHO requires efficient and effective detection of cell edge in order to switch from one network to another. Further, switching back and forth between wireless communication networks may likely result in network flapping (ping-pong) effect, which may affect overall quality of experience (QoE) and is therefore undesirable. Existing techniques provided limited solutions to proper cell edge detection and network flapping avoidance.

SUMMARY

In one embodiment, a method for switching data-paths in heterogeneous wireless communication network is disclosed. In one example, the method includes receiving a plurality of signal to noise ratio (SNR) samples for a downlink signal and for an uplink signal, and for each of a plurality of antennas of a primary wireless communication network with respect to an access device. The method further includes dynamically processing the plurality of SNR samples using a plurality of configuration parameters to detect one of a cell edge event and a network re-entry event with respect to each of the downlink signal and the uplink signal of the primary wireless communication network. The cell edge event is indicative of a weakening signal quality and the network re-entry event is indicative of a strengthening signal quality with respect to the primary wireless communication network. Upon detection of the cell edge event for the downlink signal or for the uplink signal, the method further includes disabling a data-path between the primary wireless communication network and the access device. Upon detection of the network re-entry event for the downlink signal and for the uplink signal, the method further includes enabling the data-path between the primary wireless communication network and the access device.

In one embodiment, a system for switching data-paths in heterogeneous wireless communication network is disclosed. In one example, the system includes at least one processor and a memory communicatively coupled to at least one processor. The memory stores processor-executable instructions, which, on execution, cause the processor to receive a plurality of signal to noise ratio (SNR) samples for a downlink signal and for an uplink signal, and for each of a plurality of antennas of a primary wireless communication network with respect to an access device. The processor-executable instructions, on execution, further cause the processor to dynamically process the plurality of SNR samples using a plurality of configuration parameters to detect one of a cell edge event and a network re-entry event with respect to each of the downlink signal and the uplink signal of the primary wireless communication network. The cell edge event is indicative of a weakening signal quality and the network re-entry event is indicative of a strengthening signal quality with respect to the primary wireless communication network. Upon detection of the cell edge event for the downlink signal or for the uplink signal, the processor-executable instructions, on execution, further cause the processor to disable a data-path between the primary wireless communication network and the access device. Upon detection of the network re-entry event for the downlink signal and for the uplink signal, the processor-executable instructions, on execution, further cause the processor to enable the data-path between the primary wireless communication network and the access device.

In one embodiment, a non-transitory computer-readable medium storing computer-executable instructions for switching data-paths in heterogeneous wireless communication network is disclosed. In one example, the stored instructions, when executed by a processor, cause the processor to perform operations including receiving a plurality of signal to noise ratio (SNR) samples for a downlink signal and for an uplink signal, and for each of a plurality of antennas of a primary wireless communication network with respect to an access device. The operations further include dynamically processing the plurality of SNR samples using a plurality of configuration parameters to detect one of a cell edge event and a network re-entry event with respect to each of the downlink signal and the uplink signal of the primary wireless communication network. The cell edge event is indicative of a weakening signal quality and the network re-entry event is indicative of a strengthening signal quality with respect to the primary wireless communication network. Upon detection of the cell edge event for the downlink signal or for the uplink signal, the operations further include disabling a data-path between the primary wireless communication network and the access device. Upon detection of the network re-entry event for the downlink signal and for the uplink signal, the operations further include enabling the data-path between the primary wireless communication network and the access device.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
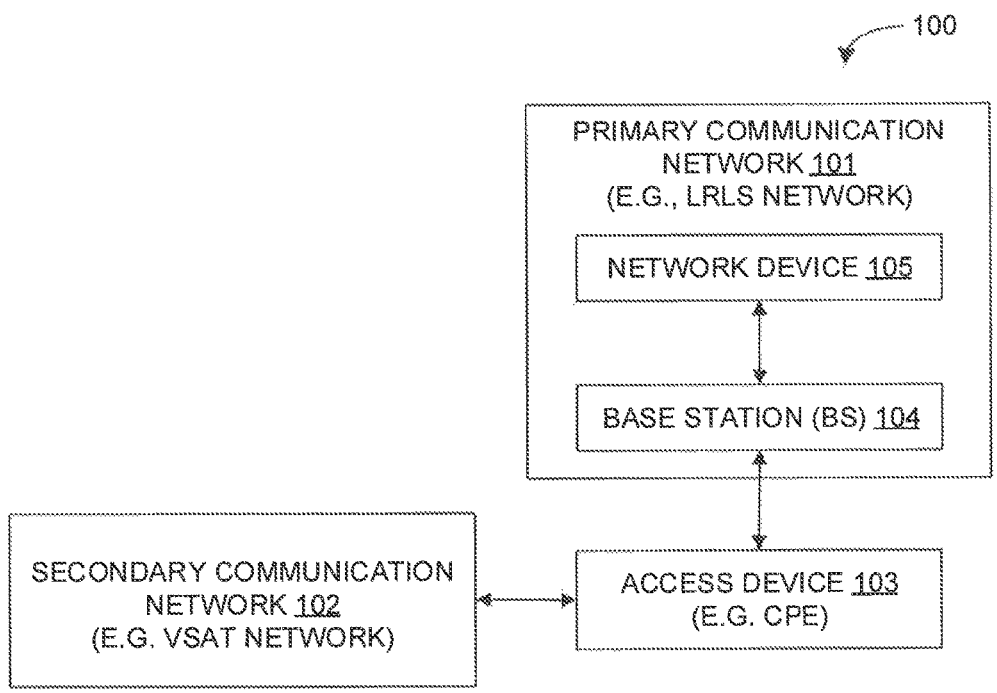
FIG. 1 illustrates an exemplary environment of heterogeneous wireless communication network in which various embodiments of the present disclosure may function.

Referring now to FIG. 1, an exemplary environment of heterogeneous wireless communication network 100 in which various embodiments of the present disclosure may function is illustrated. The heterogeneous wireless communication network 100 may include a primary wireless communication network (primary wireless network 101, hereinafter) and a secondary or a back-up wireless communication network (secondary communication network 102, hereinafter). One or more access device, such as access device 103 may communicate wirelessly with the primary communication network 101 and/or the secondary communication network 102 depending on mobility, coverage area, signal strength, charging rate, and so forth.

The primary communication network 101 may be a terrestrial wireless communication network, and may include a GSM EDGE radio access network (GERAN), a UMTS terrestrial radio access network (UTRAN), an evolved UMTS terrestrial radio access network (E-UTRAN), an improved E-UTRAN, a long-range land-to-sea (LRLS) communication network using variable-time-slot-TDMA (VTS-TDMA) in the 5 GHz unlicensed spectrum, or any new radio access networks. The primary network 101 may include a number of access points or base stations (BS) 104, each supporting communication for a number of access device 103 in its coverage area. It should be noted that the coverage area of a BS 104 may be divided into sectors that constitute only a portion of the total coverage area of all the base stations combined. A base transceiver station (BTS) and a base station controller (BSC) may form the BS 104 for GERAN, while a Node B and a radio network controller (RNC) may form the BS 104 for UTRAN. Similarly, evolved Node B (eNodeB or eNB) acts as the BS 104 for E-UTRAN i.e., long term evolution (LTE) network, while an improved eNB may act as the BS 104 for improved E-UTRAN i.e., advance LTE. A base transceiver station (BTS) with sea facing antennas (e.g., half the number of antennas required for regular BTS of cellular network) and a base station controller (BSC) may form the BS 104 for LRLS network. The depicted radio access networks are merely exemplary, and thus it will be understood that the teachings of the disclosure contemplate other existing terrestrial wireless radio access networks (e.g., worldwide interoperability for microwave access (WiMAX) network, High Speed Packet Access (3GPP's HSPA) network, and so forth) or any new wireless radio access networks that may provide for processing of data packets for transmission, in accordance with embodiments of the present disclosure.

The secondary or back-up communication network may be an aerial or satellite wireless communication network, and may include a very small aperture terminal (VSAT) network, high altitude balloons based wireless network (e.g., GOOGLE Project LOON), atmospheric satellites based wireless network, geostationary balloon satellites based wireless network, and so forth. As will be appreciated, the secondary or back-up communication network may be capable of providing wireless communication wide coverage area, specifically in remote areas or areas out of reach of the terrestrial wireless communication network.

The access device or mobile stations 103 may be a hand-held device (e.g., mobile phone, smart phone, tablet, laptop, etc.) in possession of a user, and may be referred to as a user equipment (UE). Alternatively, the access device 103 may be a device (e.g., general purpose computer, specific purpose computer, navigation device, video conference device, etc.) present in a premises of a customer (e.g., cruise ships, cargo ships, ambulance, mobile health clinic, etc.), and may be referred to as customer premise equipment (CPE). The access device 103 may communicate with the BS 104 via downlink and uplink, using various transmission protocols. The downlink (or forward link) refers to the communication link from the BS 104 to the access device 103, and the uplink (or reverse link) refers to the communication link from the access device 103 to the BS 104. Further, the access device 103 may communicate with the secondary or back-up communication network through a generic or specialized transceiver (e.g., VAST antenna).

The description below describes a heterogeneous wireless communication network comprising of the LRLS communication network providing communication between the BS on land and the CPE out in the sea (on ships) as the primary communication network 101, and a VSAT communication network providing communication between a VSAT satellite and the CPE as the secondary communication network 102 for purposes of example, and corresponding terminologies are used in much of the description below. However, as stated above, the techniques are equally applicable in heterogeneous wireless communication network comprising of other terrestrial, aerial, and/or satellite communication networks. Thus, for example, the techniques may be applicable to any wireless communication networks that employ data packet transmission. Further, the description below describes a ship out in the sea as the CPE in communication with the heterogeneous wireless communication network. However, the techniques are applicable to any access device in communication with the heterogeneous wireless communication network. Thus, for example, the techniques may be applicable to an ambulance or a mobile healthcare unit equipped with video conferencing facilities having a long term evolution (LTE) network as the primary network and VSAT network as backup service.

Thus, the following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

As discussed above, in the heterogeneous wireless communication network comprising of the LRLS communication network and the VSAT network, the cell edge has to be detected property in order to switch to a VSAT network and back to the LRLS network, particularly when there is no other BS in the CPE coverage area or when other BS's in the coverage area cannot provide a better quality of service (QoS) than the current serving BS. For example, when the CPE is at the edge of the coverage area, for example when the distance of the CPE from the BS (i.e., port) is beyond a certain distance (say, about 25 miles from the port), there may be a drop in throughput (say, to 3 MBPS). This may result in service quality maintenance issue with respect to service level agreement (SLA), which may require a certain minimum throughput (say, not less than 5 MBPS). In such a scenario, there is a need to switch to VSAT network to maintain QoS according to SLA when there is no other BS within the coverage area or when other BS's in the coverage area cannot provide a better QoS than the current serving BS.

Further, as discussed above, BS's may monitor channel quality metrics such as received signal strength indicator (RSSI), signal to noise ratio (SNR), throughput, etc. to make a joint decision in disabling the data-path between BS and CPE and triggering LRLS network switch to VSAT network, and in switching the data-path back to the LRLS network as soon as there is an improvement in required channel quality of LRLS network. This data-path switching (back and forth), between LRLS network and VSAT network is likely to get into undesirable cell edge or network flapping (ping-pong) effect, affecting overall quality of experience (QoE). Since, the LRLS network operates in a shared spectrum, the channel quality becomes unpredictable based on the usage of the shared spectrum by other entities. This may further aggravate the cell edge flapping issue after switching of data-path from VSAT network to LRLS network under unfavorable conditions of the LRLS network.

Existing techniques use SNR metrics from the access device 103 only for vertical handover (VHO) decisions. The quality of communication links of a serving network (current) as well as a target network (future) are typically evaluated. The VHO is initiated when the target network provides a better connection and service than the serving network. Existing techniques also provide for mitigating ping-pong during VHO through time-to-trigger, and VHO avoidance timers. However, as discussed above, existing techniques have limitations in solving the VHO and ping-pong effects, particularly in the heterogeneous network involving LRLS network and VSAT network.

For example, VHO's based entirely on the quality of the source network to sustain a minimum throughput (e.g., as predefined in SLA applicable to LRLS network), are not available in the existing techniques. As stated above, existing techniques have always evaluated the quality of the target network and made a switch decision when target is of superior quality compared to the source network. Additionally, VHO process in 5 GHz unlicensed spectrum (in which LRLS network operates) is not available or is not clearly defined in the existing techniques. Further, though existing techniques propose to minimize the ping-pong effects, they fail to provide for a robust and conclusive solution. Moreover, as stated above, VHO's in existing techniques have typically used access device channel (i.e., downlink) quality metrics only for making the switch decisions. The quality metrics of BS channel (i.e., uplink) have not been factored by the existing techniques.

Further, unlike cellular networks (on land), edge of the terrestrial network is not entirely identified by distance between a BS and CPE in the LRLS communication. The LRLS networks typically use the 5 GHz unlicensed spectrum, and hence are subject to interference from WiFi (802.11) and other proprietary devices in this spectrum. For example, the CPE may be 5 miles from BS (port) but maintaining required SLA (say, 5 MBPS) may fail due to heavy interference from various cafes on the port providing WiFi services. Thus, a 30 miles cell edge in an interference free LRLS network may shrink to 5 miles by interference. As a result, detecting cell edge in interference limited LRLS networks is challenging. When a cell edge is detected and the required SLA cannot be met, VHO to VSAT is initiated. However, in interference limited LRLS system, when the received signal is of the order of the interference, VHO decisions are subject to network flapping or ping-pong effect causing back and forth movement of serving network between the LRLS network and the VSAT network. As discussed above, this may degrade the QoE for end users.

It is therefore desirable to provide for a technique for cell edge detection and network flapping avoidance, particularly in the LRLS wireless network, that may be in commensurate with delivered service quality for a service-session. Further, it is desirable to provide for a conclusive solution for network ping-pong effect with delivered service quality for a session. The primary communication network 101 may include a network device 105 to achieve the above mentioned objectives in accordance with some embodiments of the present disclosure. It should be noted that, in some embodiments, the network device 105 may be a part of the BS 104. Alternatively, in some embodiments, the network device 105 may be a separate device communicatively coupled to the BS 104. The network device 105 may configure itself with configuration parameters for detection of the cell edge and the network re-entry, and buffer local and remote SNR samples for a downlink signal and for an uplink signal and for each of the antennas of BS 104 and the access device 103. Further, the network device 105 may intelligently process SNR samples from both uplink (i.e., BS) and downlink (i.e., access device 103) using the configured parameters so as to detect cell edge and decide switching from the LRLS network to the VSAT network, and disable the data-path on detecting the cell edge while maintaining the link connection to collect SNR metrics for continuous evaluation of link quality. Moreover, the network device 105 may intelligently process SNR samples from both uplink (i.e., BS) and downlink (i.e., access device 103)

using the configured parameters so as to detect network re-entry and decide switching from the VSAT network to LRLS network, and enable the data-path when the network re-entry is established.

Figure 2:
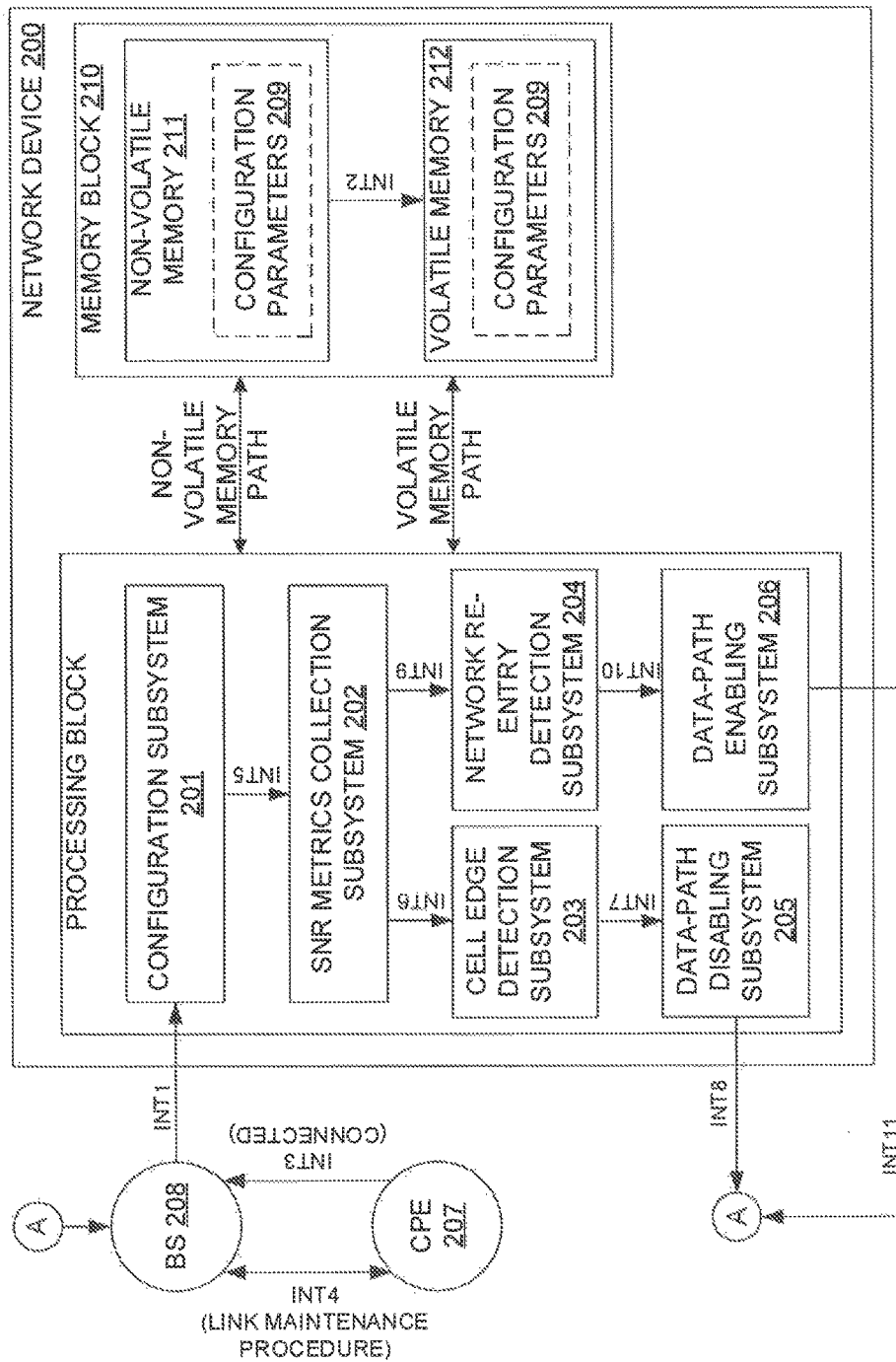
FIG. 2 is a functional block diagram of an exemplary network device that may be employed in a primary communication network of the heterogeneous wireless communication network for switching data-paths in accordance with some embodiments of the present disclosure.

Referring now to FIG. 2, a functional block diagram of an exemplary network device 200 (analogous to the network device 105 of FIG. 1) for switching data-paths is illustrated, in accordance with some embodiments of the present disclosure. In some embodiments, the network device 200 may include a configuration subsystem 201, a SNR metrics collection subsystem 202, a cell edge detection subsystem 203, a network re-entry detection subsystem 204, a data-path disabling subsystem 205, and a data-path enabling subsystem 206. A CPE 207 (analogous to the access device 103 of FIG. 1) may scan, search and connect to a BS 208 (analogous to the BS 104 of FIG. 1) via an INT3 interface. The CPE 207 and the BS 208 may also exchange media access control (MAC) protocol data units (PDU's) as part of the link maintenance procedure via an INT4 interface.

The configuration subsystem 201 may receive configuration parameters 209 for cell edge detection and for network re-entry detection from the BS 208 via an INT1 interface. As will be appreciated, in some embodiments, the BS 208 may receive the configuration parameters 209 from a network operator. Further, in some embodiments, the BS 208 may adapt the configuration parameters 209 using machine learning process based on the learning from VHO process performed by the network device 200. The configuration subsystem 201 may store the configuration parameters 209 in a non-volatile memory 211 of a memory block 210 of the network device 200. The configuration parameters 209 may include, for the cell edge event as well as for the network re-entry event, pre-configured weights (W1, W2, . . . V1, V2, . . . ) for different levels of SNR samples. The configuration parameters 209 may further include, for the cell edge event as well as for the network re-entry event, pre-configured SNR level thresholds for SNR weight assignment (T1, T2, . . . R1, R2, . . . ), pre-configured aggregate weighted SNR cell edge threshold (D), and pre-configured aggregate weighted SNR for network re-entry threshold (E), confidence percentage threshold (P) for cell edge detection, and confidence percentage threshold for network re-entry (Q). Further, whenever the BS 208 is power cycled or rebooted, the configuration subsystem 201 may access these configuration parameters 209 from the non-volatile memory 211 and provide the same to the volatile memory or main memory 212 of the memory block 210 via an INT2 interface for functioning of the cell edge detection subsystem 203 and the network re-entry detection subsystem 204.

The SNR metrics collection subsystem 202 may acquire local and remote SNR samples for the downlink signal and for the uplink signal and for each of the antennas of the BS 208 and the CPE 207, upon initiation by the BS 208 via an INT5 interface. It should be noted that, in the LRLS network, the BS 208 may have only half (½) the number of antenna arrays as CPE 207 as coverage is needed only towards the sea and no coverage is needed on land. Further, the SNR metrics collection subsystem 202 may buffer the acquired SNR samples in a circular buffer. For example, the SNR samples for the downlink signal may be buffered in a first circular buffer, and the SNR samples for the uplink signal may be buffered in a second circular buffer.

The cell edge detection subsystem 203 may access SNR samples from the first and the second circular buffers of the SNR metrics collection subsystem 202 via an INT6 interface for subsequent processing using the configuration parameters 209 received from the configuration subsystem 201. In some embodiments, the cell edge detection subsystem 203 may intelligently determine weighted SNR, combine them to get the aggregate weighted SNR, and execute logic to detect the cell edge event, in accordance with some embodiments of the present disclosure. Similarly, the network re-entry detection subsystem 204 may access SNR samples from the first and the second circular buffers of the SNR metrics collection subsystem 202 via an INT9 interface for subsequent processing using the configuration parameters 209 received from the configuration subsystem 201. In some embodiments, the network re-entry detection subsystem 204 may intelligently determine weighted SNR, combine them to get the aggregate weighted SNR, and execute logic to establish the network re-entry.

The data-path disabling subsystem 205 may receive the processed confidence percentage metric from the cell edge detection subsystem 203 via an INT7 interface. The data-path disabling subsystem 205 may then make the decision to switch to the secondary communication network 102 (e.g., VSAT network) or not. In particular, the data-path disabling subsystem 205 may decide if the data-path needs to be disabled or not based on the inputs from the cell edge detection subsystem 203. The data-path disabling subsystem 205 may compute the decision metric, and disable the data-path in the BS 208 and the CPE 207 through the data-path disable procedure based on the decision via an INT8 interface.

Similarly, the data-path enabling subsystem 206 may receive the processed confidence percentage metric from the network re-entry detection subsystem 204 via an INT10 interface. The data-path enabling subsystem 206 may then make the decision to switch back to the primary communication network 101 (e.g., LRLS network) or not. In particular, the data-path enabling subsystem 206 may decide if the data-path needs to be enabled or not based on the inputs from the network re-entry detection subsystem 204. The data-path enabling subsystem 206 may compute the decision metric, and enable the data-path in the BS 208 and the CPE 207 through the data-path enable procedure based on the decision via an INT11 interface.

Figure 3:
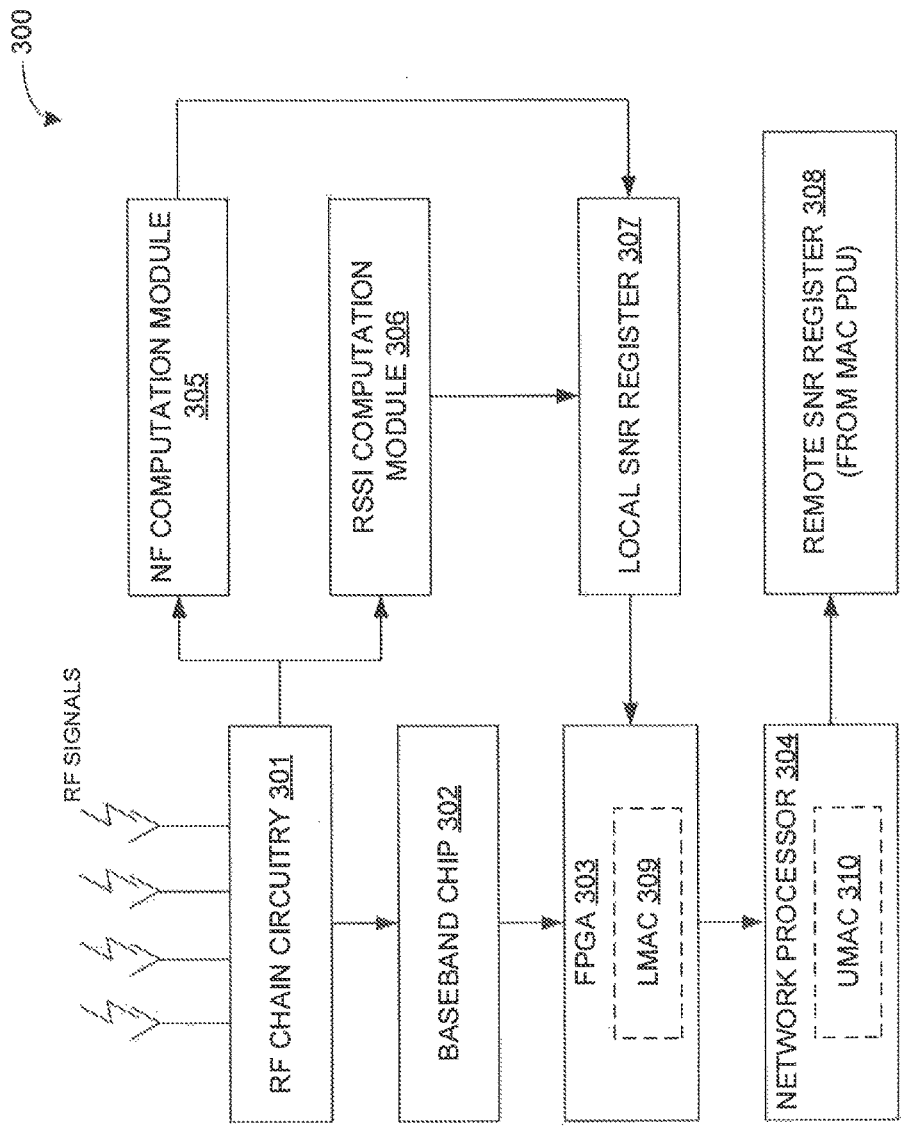
FIG. 3 is a functional block diagram of an exemplary signal to noise ratio (SNR) samples collection subsystem that may be employed in the network device in accordance with some embodiments of the present disclosure.

Referring now to FIG. 3, a functional block diagram of an exemplary SNR metrics collection subsystem 300 (analogous to the SNR metrics collection subsystem 202 of FIG. 2) is illustrated, in accordance with some embodiments of the present disclosure. In some embodiments, the SNR metrics collection subsystem 300 may include radio frequency (RF) chain circuitry 301, baseband chip 302, field programmable gate array (FPGA) 303, network processor 304, noise floor (NF) computation module 305, RSSI computation module 306, local SNR register 307, and remote SNR register 308.

The RF chain circuitry 301 may implement the RF front-end, and may include a single-chip RF transceiver designed specifically for 802.11 orthogonal frequency division multiplexing (OFDM) wireless local area network (WLAN) dual-band (e.g., 2.4 GHz and 5 GHz unlicensed frequency spectrum) applications. The RF chain circuitry 301 may provide a fully integrated receive path, transmit path, voltage controlled oscillator (VCO), frequency synthesizer, and base-band/control interface. In some embodiments, the power amplifier, RF switches, RF bandpass filters, and RF baluns may be typical components that form the RF front-end solution in the RF chain circuitry 301.

The baseband chip 302 may be a mixed-signal front-end (MxFE) baseband transceiver for broadband applications. The receive path may include an analog-to-digital converter (ADC), while the transmit path may include a digital-toanalog converter (DAC) and a programmable gain control. An internal clock distribution block may include a programmable phase-locked loop and timing generation circuitry, thereby allowing single reference block operation and has a flexible input/output (I/O) data interface for data transfers in full-duplex or half-duplex mode. The baseband chip 302 may be configurable through register programmability, and may have independent receive/transmit (Rx/Tx) power down pins.

The FPGA 303 may implement a lower MAC (LMAC) function 309. The LMAC 309 may implement cyclic redundancy check, packet aggregation, block-acknowledgements (block-ACKs) to support automatic repeat request (ARQ), reduced inter frame spacing (RIFS) or programmable inter frame spacing (programmable IFS), and flow control to reduce packets lost due to buffer overflow. Further, the LMAC function 309 may compute SNR metric based on the NF metric and the RSSI metric. The network processor 304 may host an upper MAC (UMAC) function 310. The UMAC 310 may implement the Rx/Tx state machine, ARQ, cell edge detection, network entry or re-entry logic, rate control, array switch selection, VHO, and data-path functionalities.

The NF computation module 305 may compute the NF metric per RF chain/antenna element. Similarly, the RSSI computation module 306 may compute the RSSI metric per RF chain/antenna element. The local SNR register 307 may store the NF metric computed by the NF computation module 305 as well as the RSSI metric computed by the RSSI computation module 306. Further, the remote SNR register 308 may buffer the SNR samples from the downlink and the uplink, based on the MAC PDU's exchanged between the CPE 207 and the BS 208, in the first and the second circular buffer respectively.

It should be noted that the above discussed subsystems and their modules, circuitry, etc. may be implemented in programmable hardware devices such as programmable gate arrays, programmable array logic, programmable logic devices, and so forth. Alternatively, the subsystems, circuitry, and modules may be implemented in software for execution by various types of processors. An identified engine of executable code may, for instance, include one or more physical or logical blocks of computer instructions which may, for instance, be organized as an object, procedure, function, module, or other construct. Nevertheless, the executables of an identified engine need not be physically located together, but may include disparate instructions stored in different locations which, when joined logically together, include the engine and achieve the stated purpose of the engine. Indeed, an engine of executable code may be a single instruction, or many instructions, and may even be distributed over several different code segments, among different applications, and across several memory devices.

Figure 4:
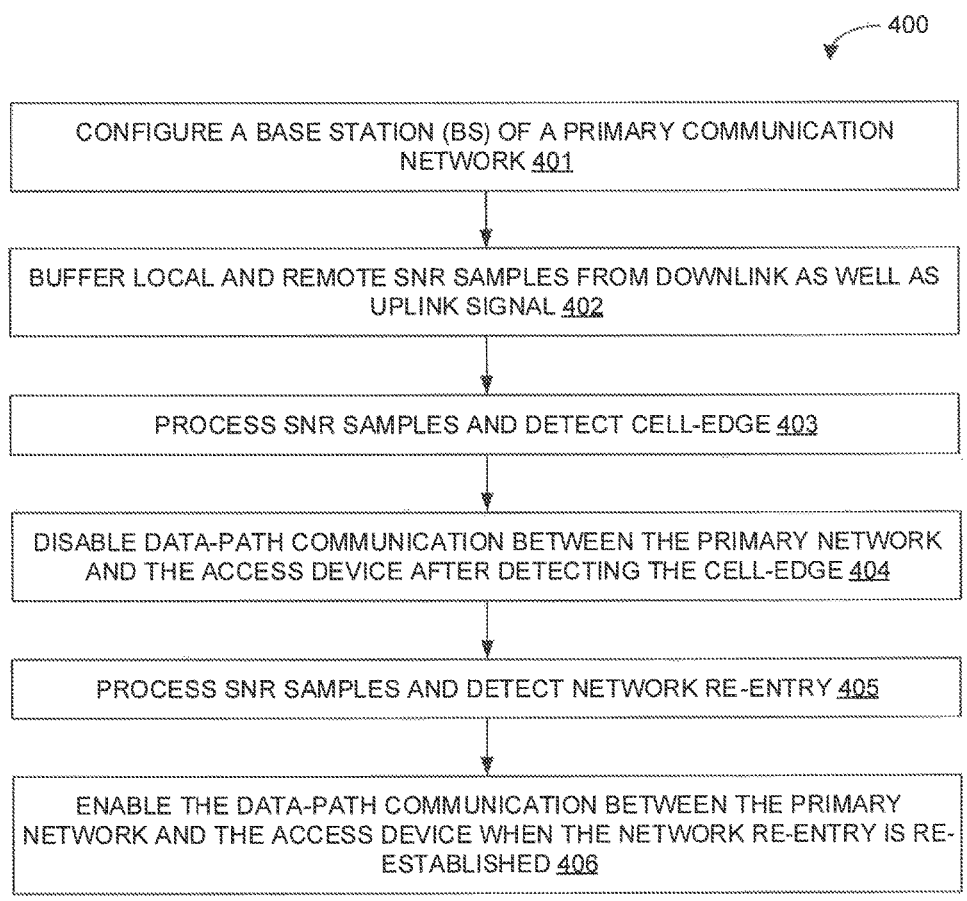
FIG. 4 is a flow diagram of an exemplary process overview for switching data-paths in heterogeneous wireless communication network in accordance with some embodiments of the present disclosure.

Referring now to FIG. 4, an overview of an exemplary process 400 for switching data-paths in heterogeneous wireless communication network is depicted via a flowchart, in accordance with some embodiments of the present disclosure. The process 400 may involve the steps of configuring the BS at step 401, buffering local and remote SNR samples from downlink as well as uplink signal at step 402, processing SNR samples and detecting cell edge at step 403, and disabling data-path communication after detecting the cell edge at step 404. The process may further involve the steps of processing SNR samples and qualifying network re-entry at step 405, and enabling data-path communication when network re-entry is established at step 406. Each of these steps will be described in greater detail herein below.

At step 401, the BS 208 may store the configuration parameters 209 for cell edge detection and for network re-entry qualification in a non-volatile memory 211 of the network device 200 for functioning of the cell edge detection subsystem 203 and the network re-entry detection subsystem 204. The configuration parameters 209 for cell edge detection subsystem 203 may include SNR thresholds for weight assignment (T1, T2, etc.) and SNR weights (W1, W2, W3, etc.) for different levels of SNR samples. Thus, for example, if there is single SNR threshold for weight assignment T1, then SNR weight above the SNR threshold T1 may be W1 and SNR weight below (or equal to) the SNR threshold T1 may be W2. Further, for example, if there are two SNR thresholds for weight assignment T1 and T2, then SNR weight above (or equal to) the SNR threshold T2 may be W1, SNR weight between the SNR threshold T1 and T2 may be W2, and SNR weight below (or equal to) the SNR threshold T1 may be W3. The configuration parameters 209 for cell edge detection subsystem 203 may further include aggregate weighted SNR cell edge threshold (D), and confidence percentage threshold on aggregate weighted SNR samples (P). Similarly, the configuration parameters 209 for network re-entry detection subsystem 204 may include SNR thresholds for weight assignment (R1, R2, etc.) and SNR weights (V1, V2, V3, etc.) for different levels of SNR samples, aggregate weighted SNR for network re-entry threshold (E), and confidence percentage threshold on aggregate weighted SNR samples (Q).

As discussed above, when the BS 208 is power cycled or rebooted, the initialization function may read the above configuration parameters 209 from the non-volatile memory 211 and load the same into the main memory for the cell edge detection subsystem 203 and network re-entry detection subsystem 204, appropriately. Additionally, the state of the communication link between the BS 208 and the CPE 207 may be initialized to not connected, inactive. After a network entry is successfully established to the BS 208 through a scan, search, and connect procedure, the state of the communication link may be marked as connected, active, and data-path enabled. As will be appreciated, this state may be mandatory for the cell edge detection subsystem 203 to be functional.

At step 402, the CPE 207 and the RF chain circuitry 301 may compute the RSSI metric (using RSSI computation module 306) and the NF metric (using the NF computation module 305) for each of the four antenna elements. This information may be made available in a hardware register (local SNR register 307). Further, the LMAC function 309 running on the FPGA 303 may access this information, and may compute the SNR metric as per Equation (1) below:

$$SNR = RSSI - NF \qquad \text{Equation (1)}$$

Further, the SNR per antenna element information may be made available in a MAC PDU, which will be periodically exchanged between the CPE 207 and BS 208 as part of the communication link maintenance procedure. The BS 208 may maintain two sets of circular buffers (one each for the CPE 207 (i.e., downlink signal) and the BS 208 (i.e., uplink signal)) of N×M most recent SNR sample sets (N is a number of samples (SAY, 50 samples) and M is a number of antenna (say, 4 antennas)). As will be appreciated, N may be configurable, while M may be based on a number antennas with CPE 207 and the BS 208. It should be noted that a new-recorded sample set may age out the oldest sample set, and hence the circular buffer may be a sliding window.

At step 403, the cell edge detection subsystem 203 may intelligently process SNR samples from both uplink (BS 208) and downlink (CPE 207) so as to decide to switch from the primary communication network 101 (e.g., LRLS network) to the secondary network (e.g., VSAT network). For example, in some embodiments, the cell edge detection subsystem 203 may periodically access each of the circular buffer and process each SNR sample, considering single threshold for weight assignment, as per logic below:

for all SNR[i]={Sj}, where 1<=i<=N and 1<=j<=M
if {Sj}>T, then {Sj'=Sj*W1}
else {Sj'=Sj*W2}

The aggregate weighted SNR sample wASNR[i] may be computed as per Equation (2) below:

$$wASNR[i]=\{\Sigma Sj'\} \text{ over all } j \qquad \text{Equation (2)}$$

The confidence percentage C, may then be computed as per logic below:

for all i such that 1<=i<=N
if wASNR[i]<D, then {Ci=1}
else {Ci=0}
C=(100/N)*ΣCi At step 404, the data-path disabling subsystem 205 may disable the data-path on detecting cell edge while maintaining the communication link connection so as to collect SNR metrics for continuous evaluation of the communication link quality. The decision metric for uplink and downlink may be evaluated independently as per the logic below:

if C>P, then
switch to the secondary communication network=yes
else do nothing
if uplink OR downlink decisions is a switch to the secondary network, only then
disable data-path
else do nothing.

The state of the communication link may be marked as connected, active and data-path disabled if the decision is to switch to the secondary communication network 102. This state may trigger the network re-entry detection subsystem 204. At step 405, the network re-entry detection subsystem 204 may intelligently process SNR samples from both uplink (BS 208) and downlink (CPE 207) so as to decide to switch from the secondary communication network 102 (e.g., VSAT network) to the primary communication network 101 (e.g., LRLS network). For example, in some embodiments, the network re-entry detection subsystem 204 may periodically access each of the circular buffer and process each SNR sample, considering single threshold for weight assignment, as per logic below:

for all SNR[i]={Sj}, where 1<=i<=N and 1<=j<=M
if {Sj}>R, then {Sj'=Sj*V1}
else {Sj'=Sj*V2}

The aggregate weighted SNR sample wASNR[i] may be computed as per Equation (3) below:

$$wASNR[i]=\{\Sigma Sj'\} \text{ over all } j \qquad \text{Equation (3)}$$

The confidence percentage C, may then be computed as per logic below:

for all i such that 1<=i<=N
if wASNR[i]>E, then {Ci=1}
else {Ci=0}
C=(100/N)*ΣCi At step 406, the data-path enabling subsystem 206 may enable the data-path when network re-entry is established. The decision metric for uplink and downlink may be evaluated independently as per the logic below:

If C>Q, then
switch back to the primary network=yes
else do nothing if uplink AND downlink decisions is a switch to the primary network, only then
enable data-path
else do nothing.

The state of the communication link may be marked as connected, active and data-path enabled. This state may trigger the cell edge detection subsystem 203.

Figure 5:
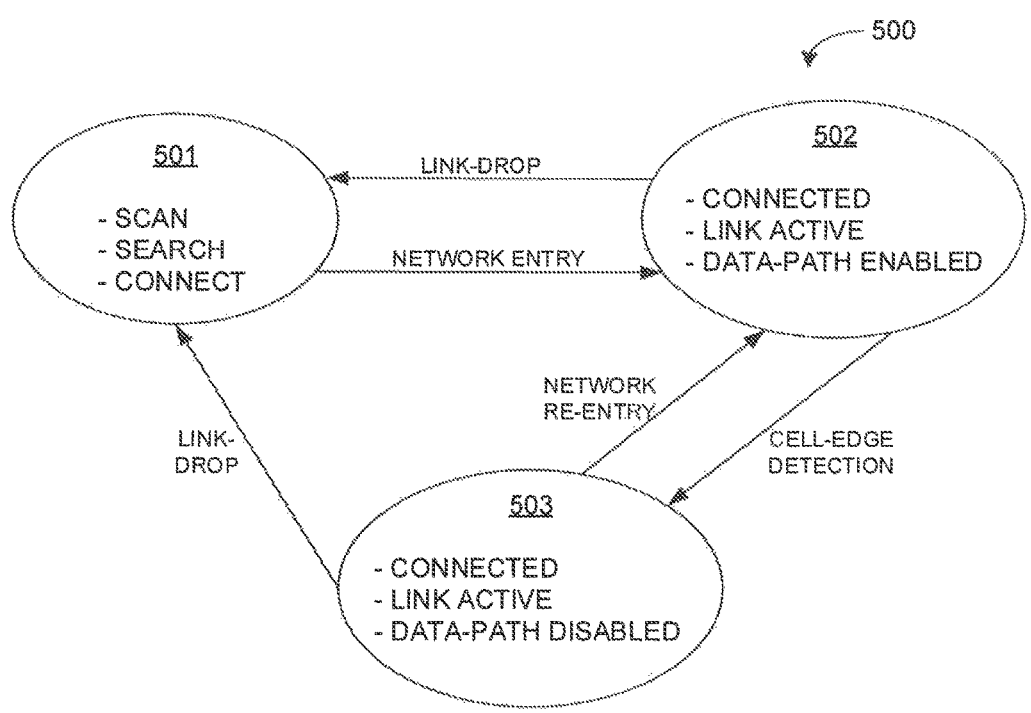
FIG. 5 illustrates a state machine diagram of an access device with respect to link-drop, cell edge detection, and network re-entry in accordance with some embodiments of the present disclosure.

Referring now to FIG. 5, a state machine diagram 500 of an access device 103 with respect to link-drop, cell edge detection, and network re-entry is depicted, in accordance with some embodiments of the present disclosure. As discussed above, at an initial state 501, the communication link between the BS 208 and the CPE 207 may be initialized to be not connected, and inactive. The CPE 207 may perform a scan, search, and connect procedure so as to establish connection with the BS. After a successful network entry through the scan, search, and connect procedure, at a functional state 502, the communication link may be marked as connected, active, and data-path enabled. In the functional state 502, the BS 208 may periodically perform a cell edge detection procedure. Upon successful cell edge detection, at a non-functional state 503, the communication link may be marked as connected, active, and data-path disabled. In the non-functional state 503, the BS 208 may periodically perform a network re-entry qualification procedure. Upon successful network re-entry qualification, at a functional state 502, the communication link may be again marked as connected, active, and data-path enabled.

By way of an example for cell edge detection, the number of antennas (M)=4, and the SNR measurement for each of the antennas of the active array in downlink signal are [4, 2, 3, 1]. Now, if threshold for weight assignment (T)=2 dB, weight for SNR above T (W1)=80, and weight for SNR below or equal to T (W2)=30, then the weighted and quantized SNR would be [3, 0, 2, 0]. In particular, for the first antenna, SNR is 4 dB which is above T=2 dB threshold, so the cell edge detection subsystem 203 would use weight W1=80 to get 4*80/100=3.2 which is quantized to 3. For the second antenna, SNR is 2 dB which is equal to T=2 dB, so use W2=30 to get 2*30/100=0.6 which is quantized to 0. Similarly, the weighted SNR is computed for the other 2 antennas to be 2 and 0. As a result, the aggregate SNR with weighting is 5 dB. It should be noted that the aggregate SNR without weighting would have been 10 dB. Now, if aggregate weighted SNR cell edge threshold (D)=6 dB, then the data-path disabling subsystem 205 would count a "yes" to disable the data-path for the aggregate SNR with weighting. It should be noted that the decision would have been "no" for the aggregate SNR without weighting. Now, if total number of samples (N) for each antenna=10 (size of the circular buffer being N=10), then the same processing is applied to the entire samples in the circular buffer. If 6 or more samples out of 10 samples (confidence thresholds (P)=60%) decide "yes" to disable data-path, then the data-path would be disabled. The process may be repeated for the uplink signal. As stated above, the data-path would be disabled if the decision to disable is either for the downlink signal or for the uplink signal.

By way of an example for network re-entry, the number of antennas (M)=4, and the SNR measurement for each of the 4 antennas of the active array in downlink signal are [10, 5, 6, 5]. Now, if threshold for weight assignment (R)=6 dB, weight for SNR above R (V1)=100, and weight for SNR below R (W2)=60, then the weighted and quantized SNR would be [10, 3, 3, 3]. In particular, for the first antenna, SNR is 10 dB which is above R=6 dB threshold, so the network re-entry detection subsystem 204 would use weight V1=100 to get 10*100/100=10. For the second antenna, SNR is 5 dB which is less than R=6 dB, so use V2=60 to get 5*60/100=3. Similarly, the weighted SNR is computed for the other 2 antennas to be 3 and 3. As a result, the aggregate SNR with weighting is 19 dB. It should be noted that the aggregate SNR without weighting would have been 26 dB. Now, if aggregate weighted SNR for network re-entry threshold (E)=24 dB, then the data-path disabling subsystem 205 would count a "no" to enable the data-path for the aggregate SNR with weighting. It should be noted that the decision would have been "yes" for the aggregate SNR without weighting. Now, the same processing is applied to the entire N=10 samples in the circular buffer. If 5 or more samples out of 10 samples (confidence thresholds (Q)=50%) decide "yes" to enable data-path, then the data-path would be enabled. It should be noted that the data-path would be enabled only if the decision to enable is for the downlink signal as well as for the uplink signal.

As will be appreciated, the thresholds D=6 dB and E=24 dB provide the sufficient hysteresis in the decision to move from the primary LRLS network to the secondary VSAT network, and vice versa, thereby conclusively fixing the ping-pong effect seen in such scenarios. It is to be noted that the larger the window size N and confidence threshold P and Q, the bigger the confidence in the decisions to switch. However, it should be noted that N cannot be too large since large number of SNR samples in the window will slow down the processing. Further, long history of SNR samples (i.e., including out dated SNR samples) may incorrectly influence the current decision. As discussed above, a multi-threshold SNR and associated weights may also be employed to achieve higher resolution in the SNR weighting. For example, if there are two thresholds T1=1 dB, T2=3 dB and weights W1=90 (SNR>T2), W2=70 (T1<SNR<=T2), W3=30 (SNR<=T1), then the weighted SNR samples for [4 2 3 1] would be [3 1 2 0] producing a weighted aggregate SNR of 6 dB.

Further, as will be appreciated by one skilled in the art, a variety of processes may be employed for switching data-paths in heterogeneous wireless communication network. For example, the exemplary heterogeneous wireless communication network 100 and the associated the primary communication network 101 may perform switching of the data-paths between the primary communication network 101 and the secondary communication network 102 by the processes discussed herein. In particular, as will be appreciated by those of ordinary skill in the art, control logic and/or automated routines for performing the techniques and steps described herein may be implemented by components of the heterogeneous wireless communication network 100 (e.g., the BS 104 and/or the network device 105), either by hardware, software, or combinations of hardware and software. For example, a suitable code may be accessed and executed by the one or more processors on the BS 104 and/or the network device 105 to perform some or all of the techniques described herein. Similarly, application specific integrated circuits (ASICs) configured to perform some or all of the processes described herein may be included in the one or more processors on the BS 104 and/or the network device 105. Additionally, it should be noted that though the process described below focuses on the LRLS network, the process may also be equally applicable to other network (e.g., LTE network) and will follow substantially similar principles with appropriate modifications in the data subsystem as well as any other associated subsystems.

Figure 6:
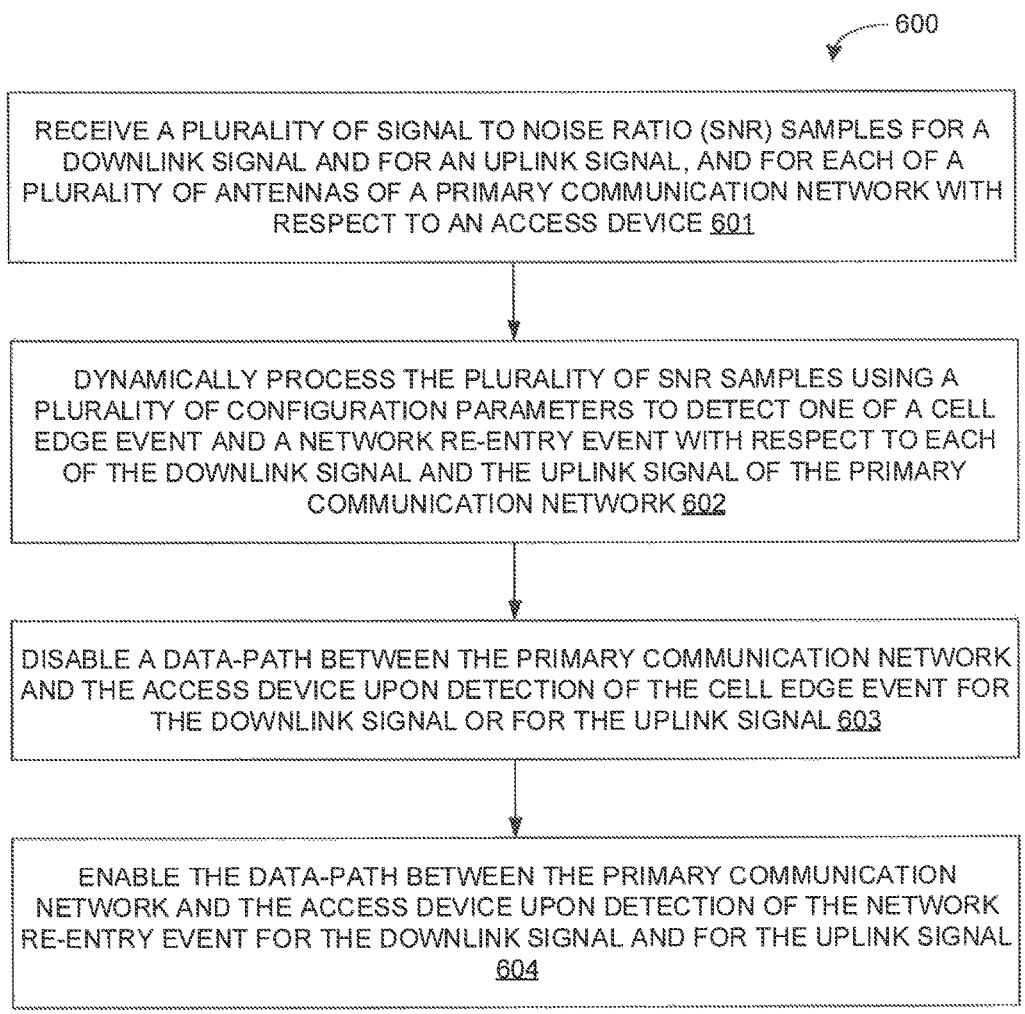
FIG. 6 is a flow diagram of an exemplary process for switching data-paths in heterogeneous wireless communication network in accordance with some embodiments of the present disclosure.

For example, referring now to FIG. 6, exemplary control logic 600 for switching data-paths in heterogeneous wireless communication network 100 via a network device, such as the BS 104 and/or the network device 105, is depicted via a flowchart, in accordance with some embodiments of the present disclosure. As illustrated in the flowchart, the control logic 600 may include the step of receiving a plurality of signal to noise ratio (SNR) samples for a downlink signal and for an uplink signal, and for each of a plurality of antennas of a primary communication network 101 with respect to an access device 103 at step 601. The control logic 600 may further include the steps of dynamically processing the plurality of SNR samples using a plurality of configuration parameters 209 to detect one of a cell edge event and a network re-entry event with respect to each of the downlink signal and the uplink signal of the primary communication network 101 at step 602, disabling a data-path between the primary communication network 101 and the access device 103 upon detection of the cell edge event for the downlink signal or for the uplink signal at step 603, and enabling the data-path between the primary communication network 101 and the access device 103 upon detection of the network re-entry event for the downlink signal and for the uplink signal at step 604. The cell edge event may be indicative of a weakening signal quality, while the network re-entry event may be indicative of a strengthening signal quality with respect to the primary communication network 101.

In some embodiments, the control logic 600 may further include the step of initializing the network device 105 with the plurality of configuration parameters 209. The plurality of configuration parameters 209 may include a plurality of pre-configured weights, and a plurality of pre-configured thresholds, for the cell edge event and for the network re-entry event. Additionally, in some embodiments, the control logic 600 may further include the step of establishing a connection and performing an activation of a communication link between the primary communication network 101 and the access device 103 through a scan, search, and connect procedure upon failure of the communication link. Moreover, in some embodiments, the control logic 600 may further include the step of buffering the plurality of SNR samples for the downlink signal in a first circular buffer, and the plurality of SNR samples for the uplink signal in a second circular buffer.

It should be noted that the uplink signal corresponds to transmission from the access device 103 to a base station (BS) 104 of the primary communication network 101, and the downlink signal corresponds to transmission from the BS 104 to the access device 103. In some embodiments, each of the plurality of SNR samples for the downlink signal is based on a received signal strength indicator (RSSI) and a noise floor (NF) at each of the plurality of antennas at the access device 103. Further, in some embodiments, each of the plurality of SNR samples for the uplink signal is based on a received signal strength indicator (RSSI) and a noise floor (NF) at each of the plurality of antennas at a BS of the primary communication network 101.

In some embodiments, for each of the downlink signal and the uplink signal, processing the SNR samples to detect the cell edge event at step 602 may include the steps of determining a plurality of weighted SNR samples corresponding to the plurality of SNR samples for each of the downlink signal and the uplink signal based on a plurality of SNR thresholds for weight assignment and a plurality of corresponding SNR weights, determining a set of aggregate weighted SNR samples for each of the plurality of antennas based on the plurality of weighted SNR samples, determining a confidence percentage for cell edge event based on the set of aggregate weighted SNR samples and an aggregate weighted SNR cell edge threshold, and detecting the cell edge event based on the confidence percentage for cell edge event and a confidence percentage threshold.

Additionally, in some embodiments, wherein, for each of the downlink signal and the uplink signal, processing the SNR samples to detect the network re-entry event at step 602 may include the steps of determining a plurality of weighted SNR samples corresponding to the plurality of SNR samples for each of the downlink signal and the uplink signal based on a plurality of SNR thresholds for weight assignment and a plurality of corresponding SNR weights, determining a set of aggregate weighted SNR samples for each of the plurality of antennas based on the plurality of weighted SNR samples, determining a confidence percentage for network re-entry event based on the set of aggregate weighted SNR samples and an aggregate weighted SNR network re-entry threshold, and detecting the network re-entry event based on the confidence percentage for network re-entry event and a confidence percentage threshold.

In some embodiments, upon detection of the cell edge event for the downlink signal or for the uplink signal, the control logic 600 may include the step of keeping a communication link between the primary communication network 101 and the access device 103 as connected and active. Additionally, in some embodiments, the communication link is used for exchanging Media Access Control (MAC) protocol data units (PDUs) between the access device 103 and a BS 104 of the primary communication network 101. Further, in some embodiments, a communication link between the primary communication network 101 and the access device 103 is in 5 GHz unlicensed spectrum.

In some embodiments, the control logic 600 may further include the steps of enabling a data-path between a secondary communication network 102 and the access device 103 upon detection of the cell edge event for the downlink signal or for the uplink signal on the primary communication network 101, and disabling the data-path between the secondary communication network 102 and the access device 103 upon detection of the network re-entry event for the downlink signal and for the uplink signal on the primary communication network 101.

As will be also appreciated, the above described techniques may take the form of computer or controller implemented processes and apparatuses for practicing those processes. The disclosure can also be embodied in the form of computer program code containing instructions embodied in tangible media, such as floppy diskettes, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

The disclosed methods and systems may be implemented on a conventional or a general-purpose computer system, such as a personal computer (PC) or server computer.

Figure 7:
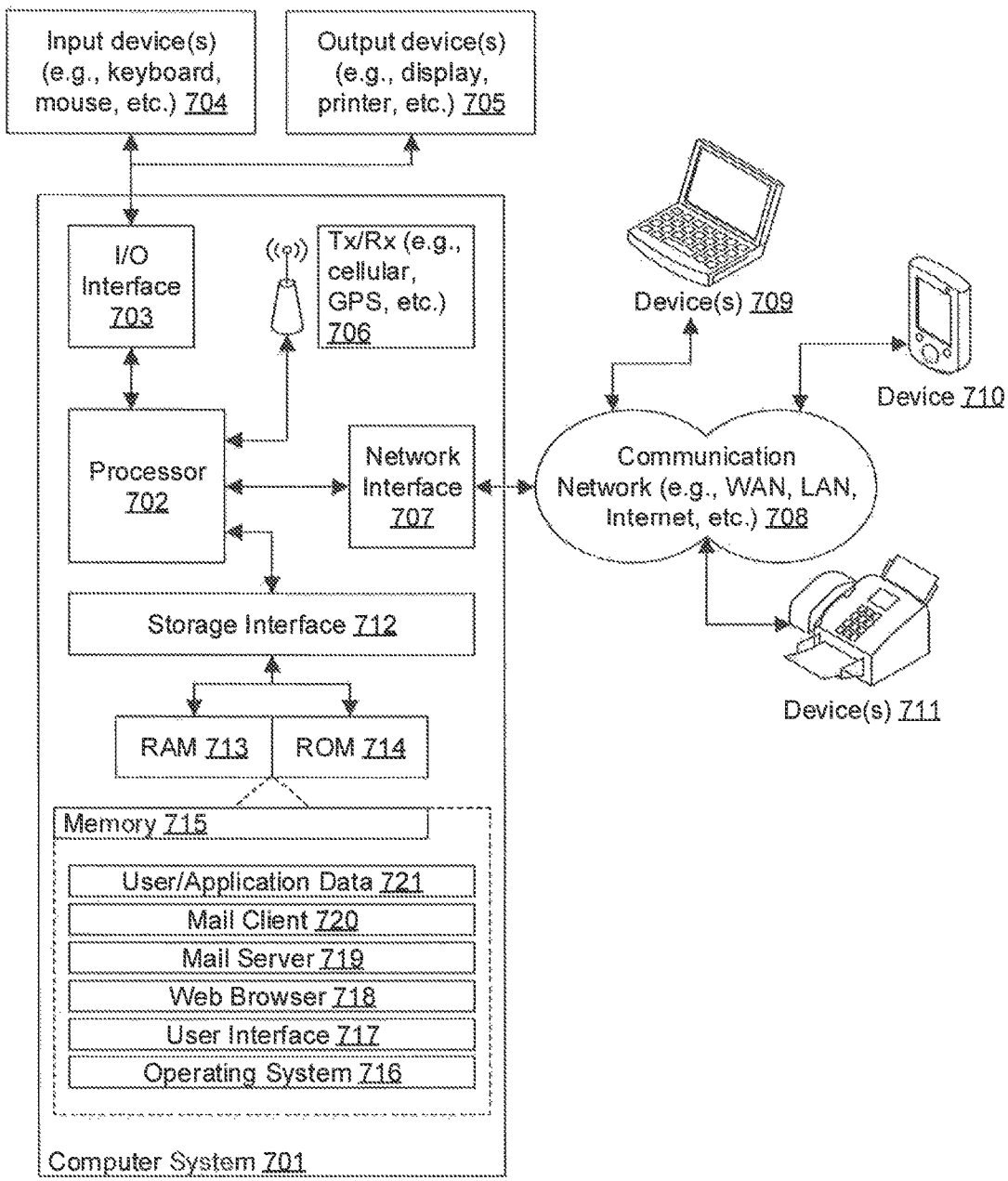
FIG. 7 is a block diagram of an exemplary computer system for implementing embodiments consistent with the present disclosure.

Referring now to FIG. 7, a block diagram of an exemplary computer system 701 for implementing embodiments consistent with the present disclosure is illustrated. Variations of computer system 701 may be used for implementing components of communication network 100 such as the access device 103, base station 104, and network device 105 for switching data-paths in heterogeneous wireless communication network 100. Computer system 701 may include a central processing unit ("CPU" or "processor") 702. Processor 702 may include at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 702 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 702 may be disposed in communication with one or more input/output (I/O) devices via I/O interface 703. The I/O interface 703 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11a/b/g/n/ac/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 703, the computer system 701 may communicate with one or more I/O devices. For example, the input device 704 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 705 may be a printer, fax machine, video display (e.g., cathode ray tube (CRT), liquid crystal display (LCD), light-emitting diode (LED), plasma, or the like), audio speaker, etc. In some embodiments, a transceiver 706 may be disposed in connection with the processor 702. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 702 may be disposed in communication with a communication network 708 via a network interface 707. The network interface 707 may communicate with the communication network 708. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 708 may include, without limitation, a direct interconnection, local area network (LAN), wide area network (WAN), wireless network (e.g., using Wireless Application Protocol), the Internet, etc. Using the network interface 707 and the communication network 708, the computer system 701 may communicate with devices 709, 710, and 711. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 701 may itself embody one or more of these devices.

In some embodiments, the processor 702 may be disposed in communication with one or more memory devices (e.g., RAM 713, ROM 714, etc.) via a storage interface 712. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 716, user interface application 717, web browser 718, mail server 719, mail client 720, user/application data 721 (e.g., any data variables or data records discussed in this disclosure), etc. The operating system 716 may facilitate resource management and operation of the computer system 701. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 717 may facilitate display, execution, interaction, manipulation, or operation of program components through textual or graphical facilities. For example, user interfaces may provide computer interaction interface elements on a display system operatively connected to the computer system 701, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 701 may implement a web browser 718 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 701 may implement a mail server 719 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 701 may implement a mail client 720 stored program component. The mail client may be a mail viewing application, such as Apple Mail, Microsoft Entourage, Microsoft Outlook, Mozilla Thunderbird, etc.

In some embodiments, computer system 701 may store user/application data 721, such as the data, variables, records, etc. (e.g., SNR samples, configuration parameters, pre-configured weights, thresholds for weight assignment, threshold for link-drop, thresholds for cell edge and network re-entry qualification, confidence percentage thresholds, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques, described in the various embodiments discussed above, provide for cell edge detection and network flapping avoidance in heterogeneous wireless communication network (e.g., comprising of LRLS wireless communication network and VSAT wireless communication network). The techniques provide a conclusive solution for eliminating or minimizing network ping-pong (toggling) effect resulting from switching back and forth between the primary and the secondary communication network 102 (specifically at cell edge), thereby improving the quality of experience (QoE) of the end user. The techniques solve the ping-pong effect using different SNR threshold criteria for disabling or enabling LRLS data-path. The techniques further ensure a sustained quality of service (QoS) for a communication session, while minimizing the use of costly secondary back-up network (e.g., satellite network) and maximizing the use of primary and preferred network (e.g., LRLS network). The VHO decision based on joint uplink and downlink SNR only metrics ensure QoS. Further, keeping the communication link active even after cell edge detection while disabling the data-path facilitates continuous collection of SNR metrics so as to qualify the communication link again for network re-entry and data-path enabling. This saves the overhead resulting from communication link teardown and re-establishment, while optimizing the usage of primary communication network 101. Moreover, as will be appreciated, since the technique is based on SNR metrics only, the technique may be easily ported to many different similar communication systems that provide a facility to fetch SNR from the hardware unit from a user or driver application.

The specification has described system and method for processing data packets for switching data-paths in heterogeneous wireless communication network. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for switching date-paths in heterogeneous wireless communication networks, the method comprising:
   receiving, by a network device, a plurality of signal to noise ratio (SNR) samples for a downlink signal and for an uplink signal, and for each of a plurality of antennas of a primary wireless communication network with respect to an access device;
   dynamically processing, by the network device, the plurality of SNR samples using a plurality of configuration parameters to detect one of a cell edge event and a network re-entry event with respect to each of the downlink signal and the uplink signal of the primary wireless communication network, wherein the cell edge event is indicative of a weakening signal quality and the network re-entry event is indicative of a strengthening signal quality with respect to the primary wireless communication network;
   upon detection of the cell edge event for the downlink signal or for the uplink signal, disabling, by the network device, a data-path between the primary wireless communication network and the access device; and
   upon detection of the network re-entry event for the downlink signal and for the uplink signal, enabling, by the network device, the data-path between the primary wireless communication network and the access device;
   further comprising initializing the network device with the plurality of configuration parameters, wherein the plurality of configuration parameters comprises a plurality of pre-configured weights, and a plurality of pre-configured thresholds, for the cell edge event and for the network re-entry event.

2. The method of claim 1, further comprising establishing a connection and performing an activation of a communication link between the primary wireless communication network and the access device through a scan, search, and connect procedure upon failure of the communication link.

3. The method of claim 1, further comprising buffering the plurality of SNR samples for the downlink signal in a first circular buffer, and the plurality of SNR samples for the uplink signal in a second circular buffer.

4. The method of claim 1, wherein the uplink signal corresponds to transmission from the access device to a base station (BS) of the primary wireless communication network, and the downlink signal corresponds to transmission from the BS to the access device.

5. The method of claim 1, wherein each of the plurality of SNR samples for the downlink signal is based on a received signal strength indicator (RSSI) and a noise floor (NF) at each of the plurality of antennas at the access device, and wherein each of the plurality of SNR samples for the uplink signal is based on a received signal strength indicator (RSSI) and a noise floor (NF) at each of the plurality of antennas at a BS of the primary wireless communication network.

6. The method of claim 1, wherein, for each of the downlink signal and the uplink signal, processing the SNR samples to detect the cell edge event comprises:
   determining a plurality of weighted SNR samples corresponding to the plurality of SNR samples for each of the downlink signal and the uplink signal, based on a plurality of SNR thresholds for weight assignment and a plurality of corresponding SNR weights;
   determining a set of aggregate weighted SNR samples for each of the plurality of antennas based on the plurality of weighted SNR samples;
   determining a confidence percentage for cell edge event based on the set of aggregate weighted SNR samples and an aggregate weighted SNR cell edge threshold; and
   detecting the cell edge event based on the confidence percentage for cell edge event and a confidence percentage threshold.

7. The method of claim 1, wherein, for each of the downlink signal and the uplink signal, processing the SNR samples to detect the network re-entry event comprises:
   determining a plurality of weighted SNR samples corresponding to the plurality of SNR samples for each of the downlink signal and the uplink signal, based on a plurality of SNR thresholds for weight assignment and a plurality of corresponding SNR weights;
   determining a set of aggregate weighted SNR samples for each of the plurality of antennas based on the plurality of weighted SNR samples;
   determining a confidence percentage for network re-entry event based on the set of aggregate weighted SNR samples and an aggregate weighted SNR network re-entry threshold; and
   detecting the network re-entry event based on the confidence percentage for network re-entry event and a confidence percentage threshold.

8. The method of claim 1, wherein upon detection of the cell edge event for the downlink signal or for the uplink signal, keeping a communication link between the primary wireless communication network and the access device as connected and active.

9. The method of claim 8, wherein the communication link is used for exchanging Media Access Control (MAC)

protocol data units (PDUs) between the access device and a BS of the primary wireless communication network.

10. The method of claim 1, wherein a communication link between the primary wireless communication network and the access device is in 5 GHz unlicensed spectrum.

11. The method of claim 1, further comprising:
upon detection of the cell edge event for the downlink signal or for the uplink signal, enabling a data-path between a secondary wireless communication network and the access device; and
upon detection of the network re-entry event for the downlink signal and for the uplink signal, disabling the data-path between the secondary wireless communication network and the access device.

12. A system for switching data-paths in heterogeneous wireless communication networks, the system comprising:
a network device comprising at least one processor and a memory for storing instructions that, when executed by the at least one processor, cause the at least one processor to perform operations comprising:
receiving a plurality of signal to noise ratio (SNR) samples for a downlink signal and for an uplink signal, and for each of a plurality of antennas of a primary wireless communication network with respect to an access device;
dynamically processing the plurality of SNR samples using a plurality of configuration parameters to detect one of a cell edge event and a network reentry event with respect to each of the downlink signal and the uplink signal of the primary wireless communication network, wherein the cell edge event is indicative of a weakening signal quality and the network re-entry event is indicative of a strengthening signal quality with respect to the primary wireless communication network;
upon detection of the cell edge event for the downlink signal or for the uplink signal, disabling a data-path between the primary wireless communication network and the access device; and
upon detection of the network re-entry event for the downlink signal and for the uplink signal, enabling the data-path between the primary wireless communication network and the access device;
further comprising initializing the network device with the plurality of configuration parameters, wherein the plurality of configuration parameters comprises a plurality of ore-configured weights, and a plurality of ore-configured thresholds, for the cell edge event and for the network re-entry event.

13. The system of claim 12, wherein the operations further comprise initializing the network device with the plurality of configuration parameters, wherein the plurality of configuration parameters comprises a plurality of pre-configured weights, and a plurality of pre-configured thresholds, for the cell edge event and for the network re-entry event.

14. The system of claim 12, wherein the operations further comprise establishing a connection and performing an activation of a communication link between the primary wireless communication network and the access device through a scan, search, and connect procedure upon failure of the communication link.

15. The system of claim 12, wherein each of the plurality of SNR samples for the downlink signal is based on a received signal strength indicator (RSSI) and a noise floor (NF) at each of the plurality of antennas at the access device, and wherein each of the plurality of SNR samples for the uplink signal is based on a received signal strength indicator (RSSI) and a noise floor (NF) at each of the plurality of antennas at a BS of the primary wireless communication network.

16. The system of claim 12, wherein, for each of the downlink signal and the uplink signal, processing the SNR samples to detect the cell edge event comprises:
determining a plurality of weighted SNR samples corresponding to the plurality of SNR samples for each of the downlink signal and the uplink signal, based on a plurality of SNR thresholds for weight assignment and a plurality of corresponding SNR weights;
determining a set of aggregate weighted SNR samples for each of the plurality of antennas based on the plurality of weighted SNR samples;
determining a confidence percentage for cell edge event based on the set of aggregate weighted SNR samples and an aggregate weighted SNR cell edge threshold; and
detecting the cell edge event based on the confidence percentage for cell edge event and a confidence percentage threshold.

17. The system of claim 12, wherein, for each of the downlink signal and the uplink signal, processing the SNR samples to detect the network re-entry event comprises:
determining a plurality of weighted SNR samples corresponding to the plurality of SNR samples for each of the downlink signal and the uplink signal, based on a plurality of SNR thresholds for weight assignment and a plurality of corresponding SNR weights;
determining a set of aggregate weighted SNR samples for each of the plurality of antennas based on the plurality of weighted SNR samples;
determining a confidence percentage for network re-entry event based on the set of aggregate weighted SNR samples and an aggregate weighted SNR network re-entry threshold; and
detecting the network re-entry event based on the confidence percentage for network re-entry event and a confidence percentage threshold.

18. The system of claim 12, wherein upon detection of the cell edge event for the downlink signal or for the uplink signal, keeping a communication link between the primary wireless communication network and the access device as connected and active.

19. A non-transitory computer-readable medium storing instructions for switching data-paths in heterogeneous wireless communication networks, wherein upon execution of the instructions by one or more processors, the processors perform operations comprising;
receiving a plurality of signal to noise ratio (SNR) samples for a downlink signal and for an uplink signal, and for each of a plurality of antennas of a primary wireless communication network with respect to an access device;
dynamically processing the plurality of SNR samples using a plurality of configuration parameters to detect one of a cell edge event and a network re-entry event with respect to each of the downlink signal and the uplink signal of the primary wireless communication network, wherein the cell edge event is indicative of a weakening signal quality and the network re-entry event is indicative of a strengthening signal quality with respect to the primary wireless communication network;

upon detection of the cell edge event for the downlink signal or for the uplink signal, disabling a data-path between the primary wireless communication network and the access device; and upon detection of the network re-entry event for the downlink signal and for the uplink signal, enabling the data-path between the primary wireless communication access device;

further comprising initializing the network device with the plurality of configuration parameters, wherein the plurality of configuration parameters comprises a plurality of pre-configured weights, and a plurality of pre-configured thresholds, for the cell edge event and for the network re-entry event.

* * * * *